United States Patent
Neagu et al.

(10) Patent No.: US 10,623,413 B2
(45) Date of Patent: Apr. 14, 2020

(54) SECURITY TRACKING OF COMPUTER RESOURCES

(71) Applicant: FORMRC, Inc., Bellevue, WA (US)

(72) Inventors: Adriana Neagu, Mercer Island, WA (US); Mihaela Victoria Croitoru, Sammamish, WA (US); F Joseph Verschueren, Mercer Island, WA (US)

(73) Assignee: FORMRC, Inc., Bellevue, WA (US)

( * ) Notice: Subject to any disclaimer, the term of this patent is extended or adjusted under 35 U.S.C. 154(b) by 0 days.

(21) Appl. No.: 16/230,543

(22) Filed: Dec. 21, 2018

(65) Prior Publication Data

US 2019/0222579 A1 Jul. 18, 2019

Related U.S. Application Data

(63) Continuation of application No. 15/136,659, filed on Apr. 22, 2016, now abandoned.

(60) Provisional application No. 62/151,331, filed on Apr. 22, 2015.

(51) Int. Cl.
*H04L 29/06* (2006.01)
*H04L 12/911* (2013.01)

(52) U.S. Cl.
CPC .......... *H04L 63/102* (2013.01); *H04L 47/781* (2013.01)

(58) Field of Classification Search
CPC ..... H04L 47/70; H04L 63/10; H04L 43/0876; H04L 63/20; H04L 63/1416; H04L 63/1425; G06F 11/30; G06F 3/0649; H04N 21/2407; H04N 21/2541; H04N 21/4627
See application file for complete search history.

(56) References Cited

U.S. PATENT DOCUMENTS

2011/0035499 A1* 2/2011 Lee .................. G06Q 10/06
                                                       709/226

* cited by examiner

*Primary Examiner* — Tri M Tran
(74) *Attorney, Agent, or Firm* — Perkins Coie LLP

(57) ABSTRACT

An allocation system that tracks allocation of computer resources is provided. The allocation system allocates a number of user-periods to an organization for accessing a computer resource. The allocation system determines a depletion date based on the number of user-periods and number of users. When a new user is added, the allocation system re-determines the depletion date based on an additional user. When a user is removed, the allocation system re-determines the depletion date based on one less user. When an additional number of user-periods are allocated to the organization, the allocation system re-determines the depletion date based on the additional number of user-periods.

12 Claims, 8 Drawing Sheets

SECURITY TRACKING OF COMPUTER RESOURCES

CROSS-REFERENCE TO RELATED APPLICATION(S)

This application is a continuation of U.S. patent application Ser. No. 15/136,659, filed Apr. 22, 2016, and claims the benefit of U.S. Provisional Patent Application No. 62/151,331 filed on Apr. 22, 2015. The foregoing applications are incorporated herein by reference in their entireties.

BACKGROUND

Many service providers provide computer resources (e.g., applications) to organizations with use restrictions. For example, an organization such as a university may make a university portal application available to the mobile devices of its students. The portal application may allow students to access various resources of the university such as a transcript record system, a catalog of research articles, a class enrollment system, a calendar scheduling system (e.g., to schedule meetings with professors), and so on. A service provider who developed the portal application may make the portal application available for download by the students of the university. A use restriction may be some limit on the usage of the computer resource. For example, the service provider of the portal application may want to restrict the use of the application to some number of students.

It is important for both an organization and a service provider to ensure that the use restrictions are accurately monitored. The dynamic nature of some organizations, however, makes it difficult to accurately monitor the uses of computer resources. For example, during the course of a school year, students may drop out of school at any time, students may take a quarter off, some students may find the portal application to be not useful and stop using it, and so on. The university may want to disable the use of the portal application by these former and current students (and any non-student) for security reasons and ensure that their downloads of the portal application are no longer factored into the use restrictions. Similarly, the service provider may want to ensure that only authorized student can download and use the portal application.

DETAILED DESCRIPTION

Figure 1:
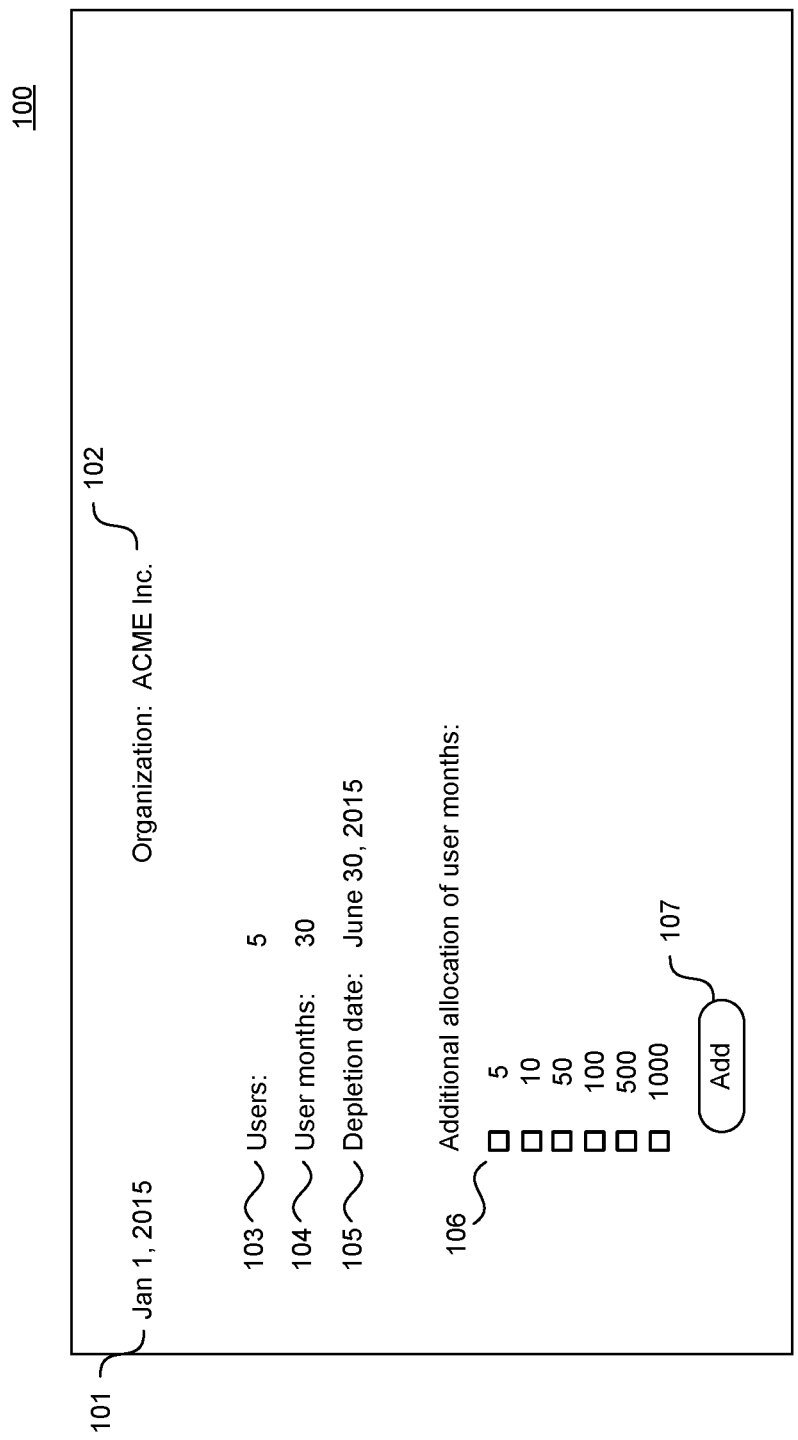
FIG. 1 illustrates a display page for viewing current status and adding an additional allocation of user-months.

In some embodiments, a method and system for tracking allocations of computer resources and depletion of the allocations is provided. The allocation system allocates to an organization user-periods for accessing computer resources. The computer resources may be any service provided by a computer system and may include forms or applications of the organization that are hosted by a forms or applications management system, computer programs of a service provider, data of a data provider, and so on. An allocation of a user-period indicates that one user has been allocated usage of the computer resource during the period. For example, if the period is one month, then a user-month indicates that one user has permission to use the computer resource for a month, a user-month also indicates that two users have permission to use the computer resources for a half of a month, and so on. An organization my initially be allocated some number of computer resources such as 30 user-months. If the organization has three users of the computer resources, then the 30 user-months will be depleted in 10 months, referred to as the depletion period. The date when the user-months were allocated plus the depletion period is considered to be the depletion date when the allocation of user-months is fully depleted. So, if on Jan. 1, 2015, 30 user-months were allocated to an organization with three users, then the depletion period would be 10 months, and the depletion date would be Oct. 31, 2015.

As users are added and removed or additional user-periods are allocated, the allocation system adjusts the depletion date based on the current depletion period, which that is the current depletion date minus the current date. When a user is added, the allocation system sets the depletion date to the current date plus the current depletion period adjusted by the ratio of the number of current users to that number plus one. For example, if an organization currently has five users, the current date is Jan. 1, 2015, and the depletion date is Jun. 30, 2015, when a user is added, the depletion date would be set to May 31, 2015 (i.e., January 1+5/6*6 months). Similarly, when a user is removed, the allocation system sets the depletion date to the current date plus the current depletion period adjusted by the ratio of the number of current users to that number minus one. Continuing with the example, if a user is immediately removed after one is added, then the depletion date would be advanced to Jun. 30, 2015 (i.e., January 1+6/5*5 months). When additional user-periods are allocated, the allocation system sets the depletion date to the sum of current date and the current depletion period times the number of users plus the additional user-periods divided by the number of users. Continuing with the example with five users, if 10 additional user-months are allocated on Jan. 1, 2015, the depletion date would be advanced to Aug. 31, 2015 (i.e., January 1+(6*5+10)/5). Although the examples are expressed in days, the allocation system may actually represent the depletion date as number of hours, minutes, or seconds from some standard base date. If represented in seconds, a user-month may be represented as the number of seconds in a year divided by 12. The allocation system may, however, display the depletion date at the day level and may consider the actual depletion of user-periods to occur at the end of the depletion date.

The use of user-periods allows the allocation system to allocate any number of user-periods to an organization at any time. An organization may be given the choice to be allocated user-periods at various levels such as 10 user-months, 50 user-months, 100 user-months, and so on. An organization may be encouraged to select a higher level of user-periods based on a lower rate per user-period. For example, the rate may be two monetary units per user-month at the 10 user-month level and one monetary unit per user-month at the 100 user-month level.

In some embodiments, a per-use model may be employed in addition to or in place of a user-period allocation model as described above. With the per-use model, a per-use tracking system may track each use of a computer resource by a person authorized by an organization to use that computer resource. The per-use model can be used to track uses of forms or applications provided by an organization. With the per-use model, the per-use tracking system tracks each successful completion of a request using that form or application. The per-use tracking system may have a client-side component (e.g., an application) that is downloaded to a mobile device of a user. An organization may provide the user with a computer resource identifier (e.g., URI) that identifies a form or application of the organization. When a user accesses the URI, the client-side component is launched and may request the identified form or application from a server. When the server-side component detects that the identified form or application was successfully sent to the client-side component, the server-side component updates a count of uses of the form or application. After the user fills out and submits the form, the client-side component transmits the data of the form to a server of the organization. The organization may provide the identifiers of its form to only authorized persons, and the client-side component may perform a security check to ensure the user is the authorized person.

FIG. 1 illustrates a display page for viewing current status and adding an additional allocation of user-months. A display page 100 includes a current date area 101 and an organization identification area 102. The display page also includes a status area that includes the number of users 103, the number of remaining (i.e., not depleted) user-months 104, and the depletion date 105. The display page includes an allocation area that provides checkboxes 106 for selecting various allocations of user-months and an add button 107 for adding the selected allocation of user-months for the organization.

Figure 2:
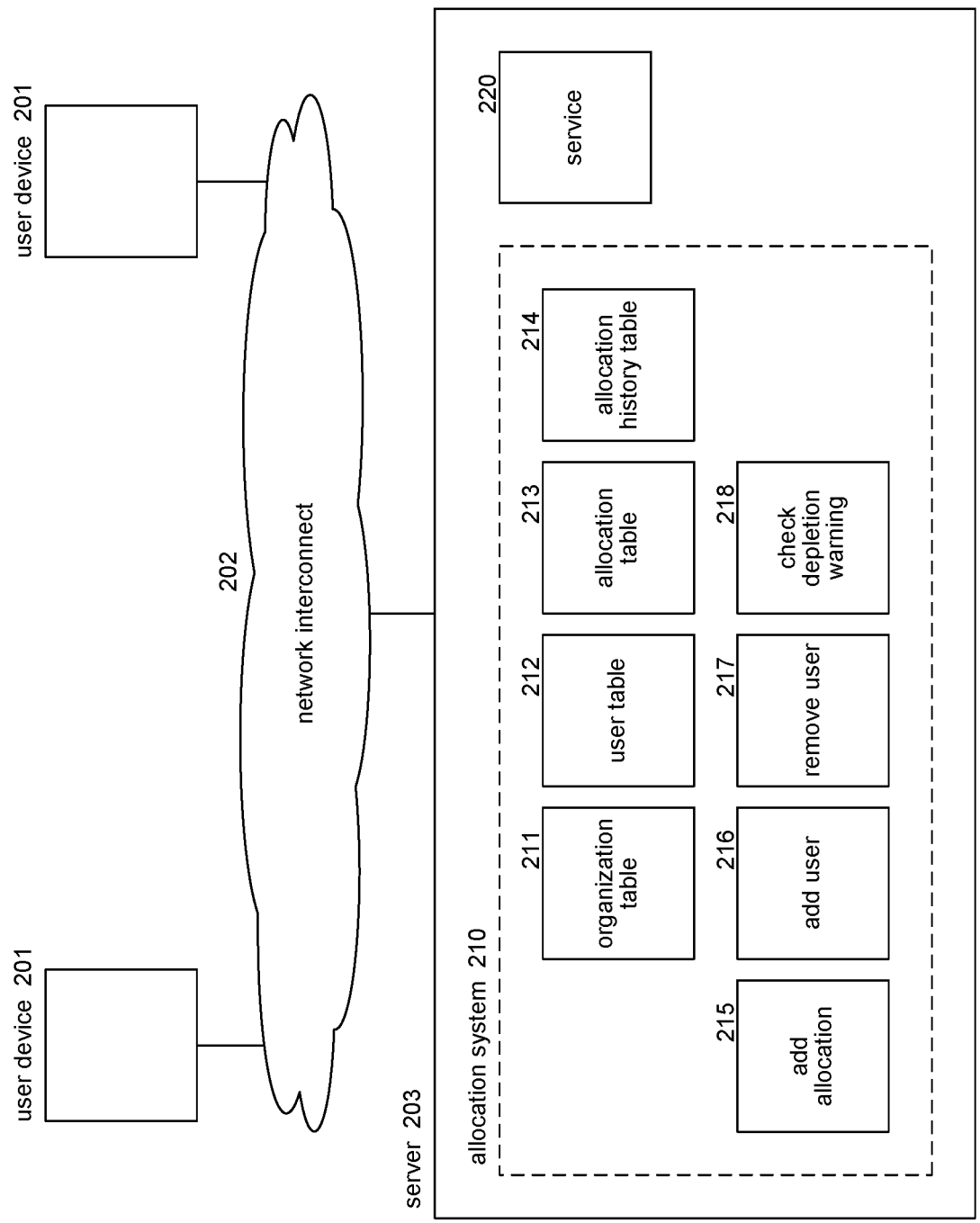
FIG. 2 is a block diagram that illustrates components of the allocation system in some embodiments.

FIG. 2 is a block diagram that illustrates components of the allocation system in some embodiments. User devices 201 connect through a network interconnect 202 to a server 203 that hosts the allocation system 210. The user devices may be desktop computers, tablets, smart phones, televisions, or more generally any type of computing device. The network interconnect may be the Internet, a cellular network, a local area network within an organization, and so on.

The allocation system includes a database with an organization table 211, a user table 212, an allocation table 213, and an allocation history table 214. The organization table contains a record for each organization and may contain records for sub-organizations (e.g., divisions) of an organization. Each record stores general information about an organization such as name, parent organization, address, parent organization identifier, and so on. The allocation system may allocate user-periods to an organization and allow the organization to then sub-allocate the user-months to its sub-organizations. Each organization (including sub-organizations) may have one or more administrative user with the authority to allocate and sub-allocate user-periods and to add and remove users. In some embodiments, a user of an organization would only affect the depletion date of one sub-organization even though the user may be a user of multiple sub-organizations and have access to the computer resources of those sub-organizations. The allocation system may consider a user to be a member of one sub-organization whose allocation is depleted and a guest user of other sub-organizations whose allocations are not depleted for that guest user. For example, an administrative user for the organization may be added as a guest user of each sub-organization and only affect the depletion date of the parent organization. The user table contains a record for each user of an organization and may contain general information such as the name and electronic mail address of the user. The allocation table includes a record for each organization that contains information describing the allocation of user-months to that organization. The information may include number of users, depletion date, and so on. The allocation history table contains a record for each allocation of user-months to an organization and a record for each addition or removal of a user from an organization.

The allocation system also includes an add allocation component 215, an add user component 216, a remove user component 217, and a check depletion warning component 218. The add allocation component is invoked when a user selects to add an allocation of user-months for an organization. The add user component and the remove user component are invoked to add user to and remove users from an organization. The check depletion warning component is invoked periodically to check whether a depletion warning should be provided to an organization. The server 203 may also host a service component 220 that provides access to the computer resources. For example the service component may be a forms server that provides forms to the user devices.

In some embodiment, the organization may have installed on its own computer systems the tables and components of the allocation system. In this way, the organization can independently verify the accuracy of the allocation tracking performed by the service provider. In such a case, when the organization adds an allocation, adds a user, or removes a user at their allocation system, a message may be automatically sent to the allocation system of the service provider. For example, the allocation system of organization may be programmed to interface with a web service interface of the allocation system of the service provider. If the organization interfaces with multiple service providers, the allocation system of the organization may include a service provider table that describes how to send messages to each service provider such as by providing a uniform resource identifier of the web service interface for each service provider. In addition, the user table, allocation table, and allocation history table may further specify to which service provider each record pertains.

The computing devices and systems on which the allocation system and per-use tracking system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the systems. The data transmission media is used for transmitting data via transitory, propagating signals or carrier waves (e.g., electromagnetism) via a wired or wireless connection.

The systems may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the system may be implemented in hardware using, for example, an application-specific integrated circuit ("ASIC").

Figure 3:
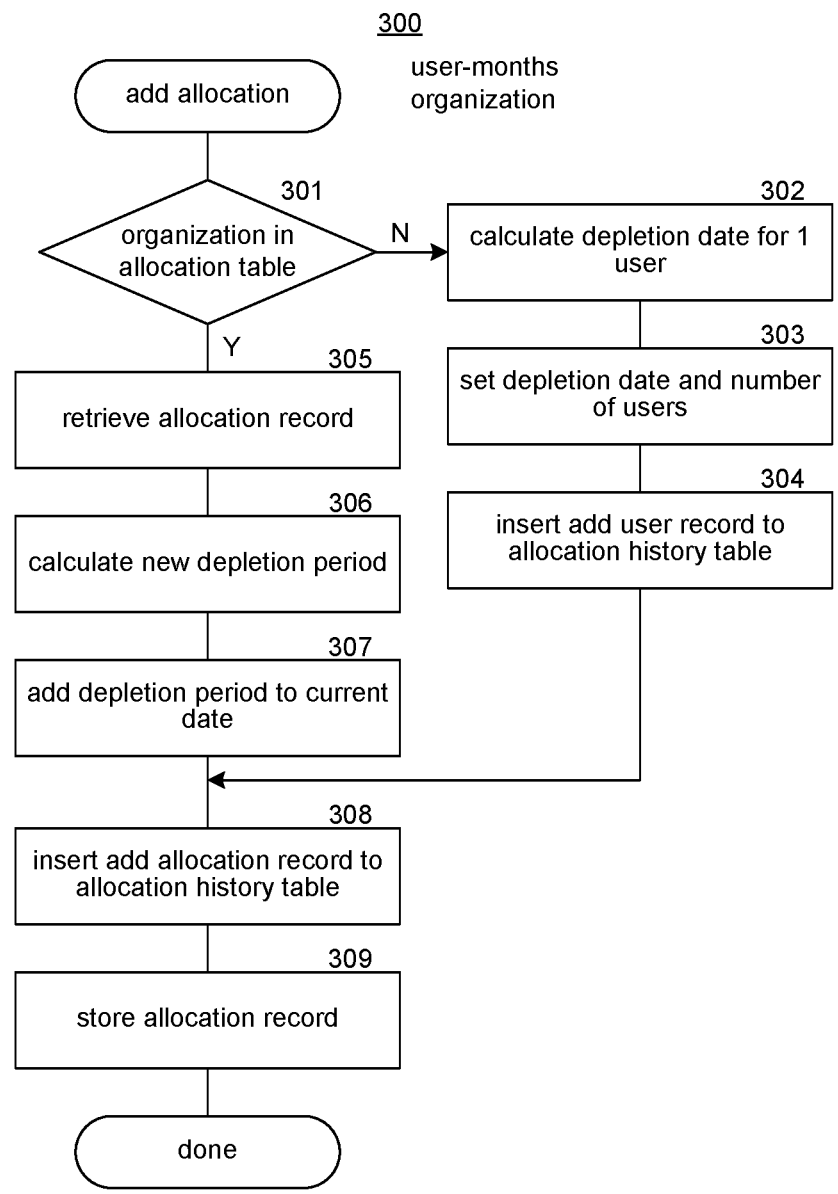
FIG. 3 is a flow diagram that illustrates the processing of an add allocation component of the allocation system in some embodiments.

FIG. 3 is a flow diagram that illustrates the processing of an add allocation component of the allocation system in some embodiments. The add allocation component 300 is invoked to add allocations of user-months to an organization. In decision block 301, if the organization already has a record in the allocation table, then the component continues at block 305, else the component continues at block 302. In block 302, the component calculates the depletion date for one user given the allocated user-months, which may represent an administrative user. In block 303, the component sets the depletion date and number of users. In block 304, the component inserts an add user record to the allocation history table and then continues at block 308. In block 305, the component retrieves the allocation record for the organization from the allocation table. In block 306, the component calculates the new depletion period based on the current depletion period plus the number of newly allocated user-months, and number of users. In block 307, the component adds the depletion period to the current date to set the depletion date. In block 308, the component inserts an add allocation record into the allocation history table. In block 309, the component stores the allocation record for the organization in the allocation table to insert a new or replace an existing allocation record and then completes.

Figure 4:
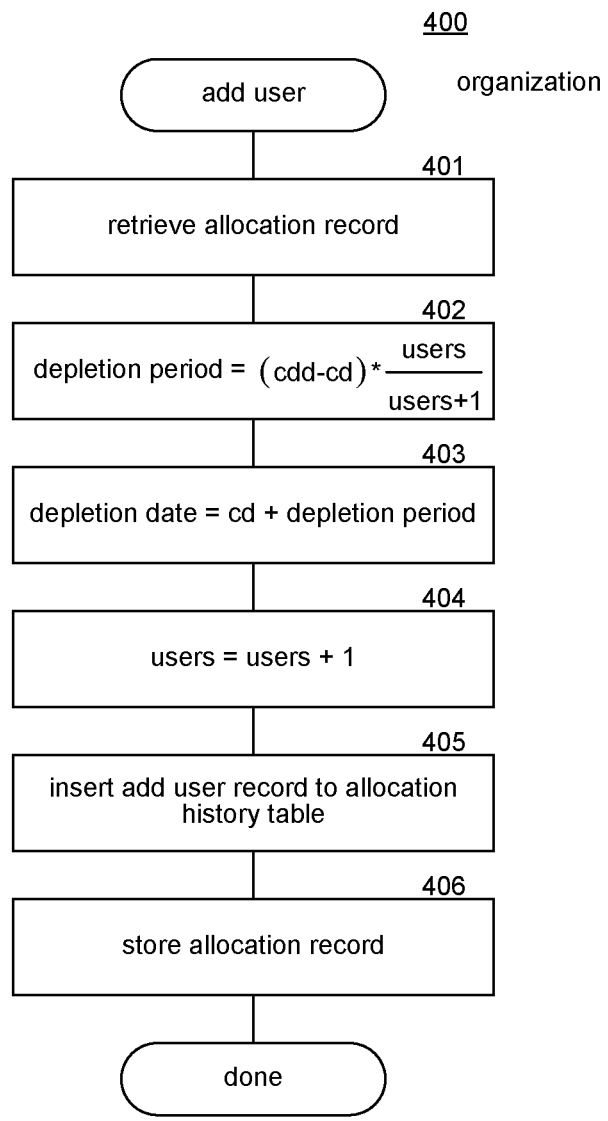
FIG. 4 is a flow diagram that illustrates the processing of an add user component of the allocation system in some embodiments.

FIG. 4 is a flow diagram that illustrates the processing of an add user component of the allocation system in some embodiments. The add user component 400 is invoked to add a user for an organization. In block 401, the component retrieves the allocation record for the organization from the allocation table. In block 402, the component calculates the depletion period as the current depletion date ("cdd") minus the current date ("cd") times the number of users divided by the number of users plus one. In block 403, the component sets the depletion date to the current date plus the depletion period. In block 404, the component increments the count of users. In block 405, the component inserts a new add user record into the allocation history table. In block 406, the component stores the allocation record in the allocation table and then completes.

Figure 5:
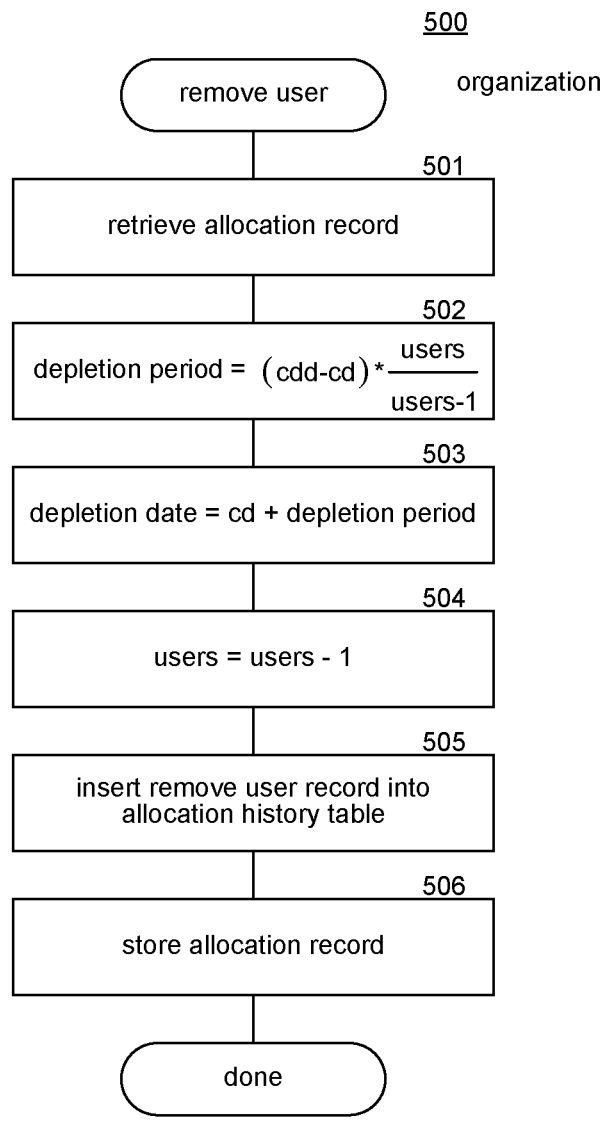
FIG. 5 is a flow diagram that illustrates the processing of a remove user component of the allocation system in some embodiments.

FIG. 5 is a flow diagram that illustrates the processing of a remove user component of the allocation system in some embodiments. The remove user component 500 is invoked to remove a user for an organization. In block 501, the component retrieves the allocation record for the organization from the allocation table. In block 502, the component calculates the depletion period as the current depletion date minus the current date times the number of users divided by the number of users minus one. In block 503, the component sets the depletion date to the current date plus depletion period. In block 504, the component decrements the count of users. In block 505, the component inserts a new remove user record into the allocation history table. In block 506, the component stores the allocation record in the allocation table and then completes.

Figure 6:
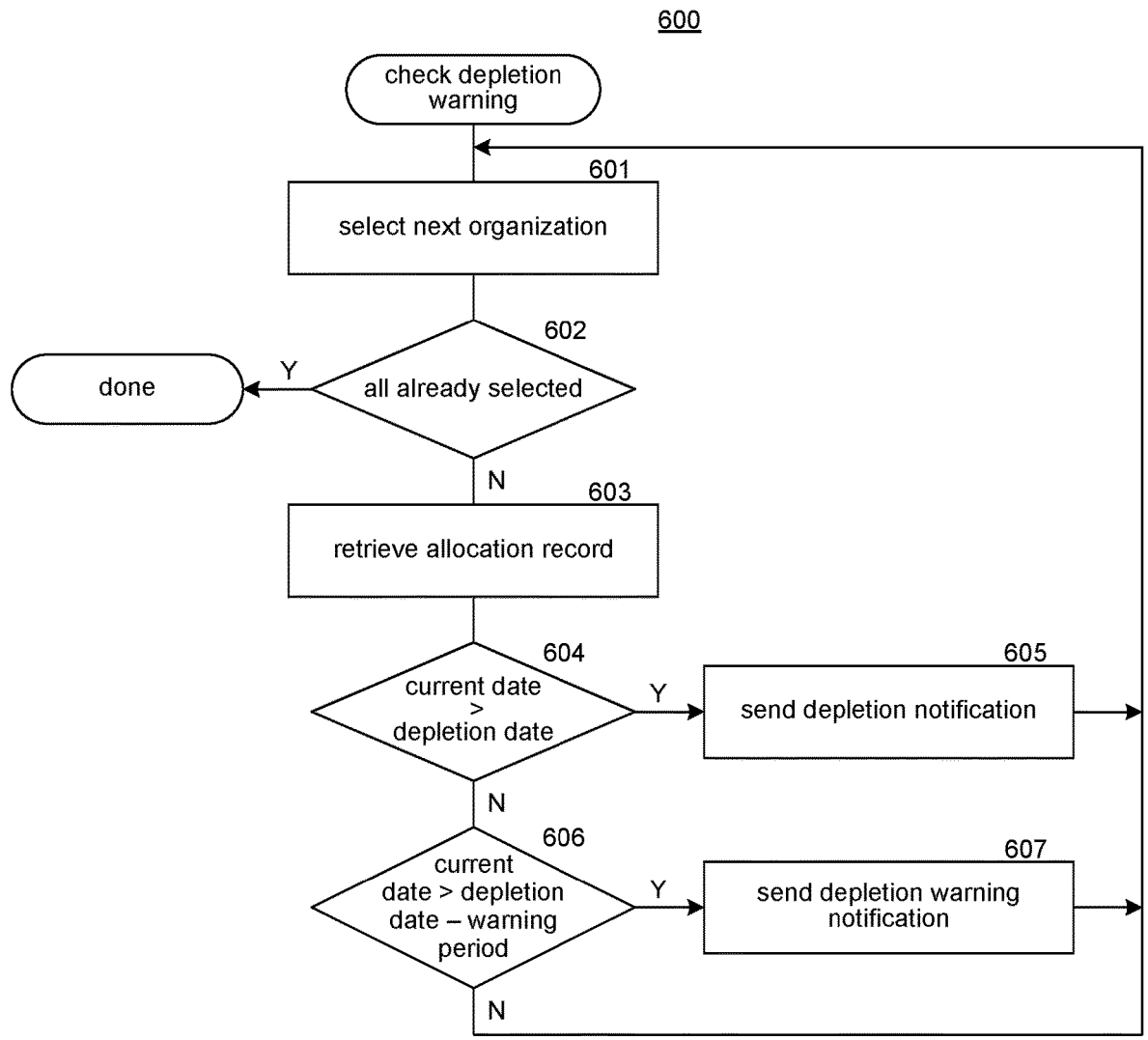
FIG. 6 is a flow diagram that illustrates the processing of a check depletion warning component of the allocation system in some embodiments.

FIG. 6 is a flow diagram that illustrates the processing of a check depletion warning component of the allocation system in some embodiments. The check depletion warning component 600 is invoked periodically to determine whether the organization should be warned that the depletion date is approaching. In block 601, the component selects the next organization. In decision block 602, if all the organizations already been selected, then the component completes, else the component continues at block 603. In block 603, the component retrieves the allocation record for the selected organization from the allocation table. In decision block 604, if the current date is after the depletion date, then the component continues at block 605, else the component continues at block 606. In block 605, the component sends (e.g., via email) a depletion notification to the organization and then loops to block 601 to select the next organization. In decision block 606, if the current date is within a warning period of the depletion date, then the component continues at block 607, else the component loops to block 601 to select the next organization. The warning period may be stored in the record for the organization in the allocation table or in the organization table or may be a system-wide setting. In block 607, the component sends (e.g., via email) a depletion warning notification to the organization and loops to block 601 to select the next organization.

Figure 7:
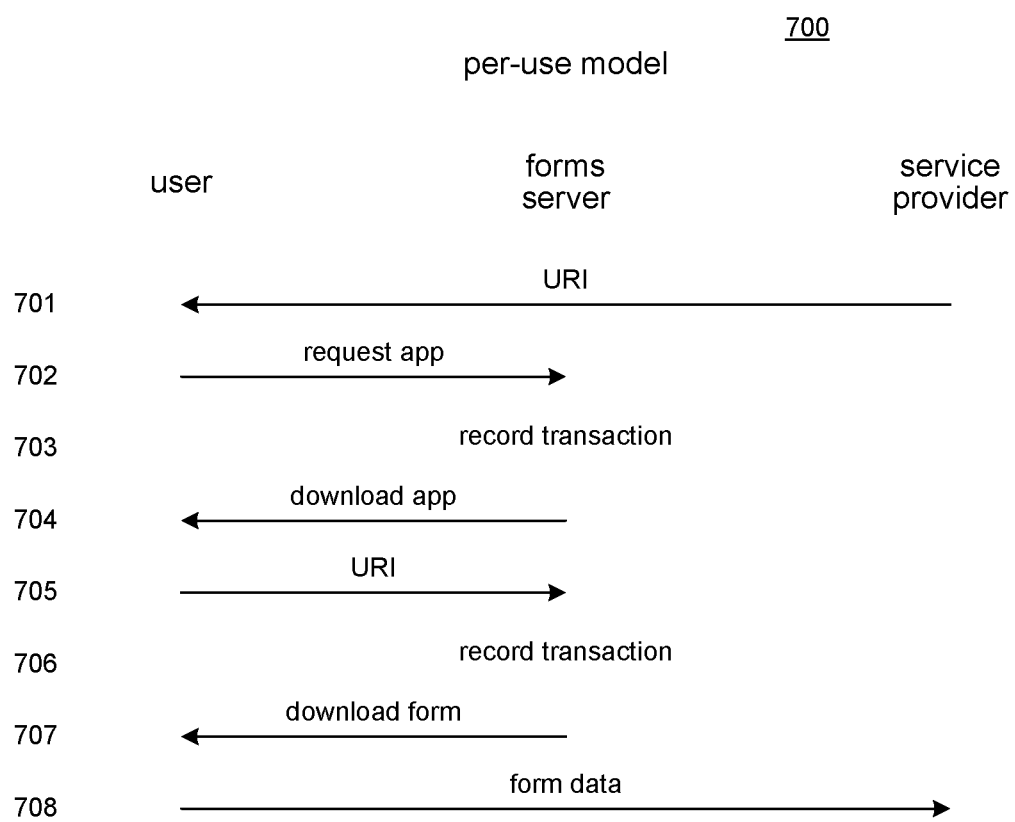
FIG. 7 is a diagram that illustrates the flow of information of the per-use model in some embodiments.

FIG. 7 is a diagram that illustrates the flow of information of the per-use model in some embodiments. The diagram 700 illustrates communications between a user device, a forms server, and a service provider server (e.g., an organization server). Initially, the service provider server provides 701 to the user device a URI identifying a form. The URI may also include data identifying the user and data to pre-populate fields of the form. If the user device does not have the client-side component, the user device requests 702 the client-side component from the forms server. In response, the forms server records 703 a transaction indicating that the client-side component has been downloaded and provides 704 the client-side component to the user device. The client-side component executing at the user device then requests 705 the form from the forms server. In response, the form server records 706 a transaction that the form has been downloaded and provides 707 the form to the user device. After the user completes filling out the form, the client-side component executing at the user device forwards 708 form data to the service provider server.

Figure 8:
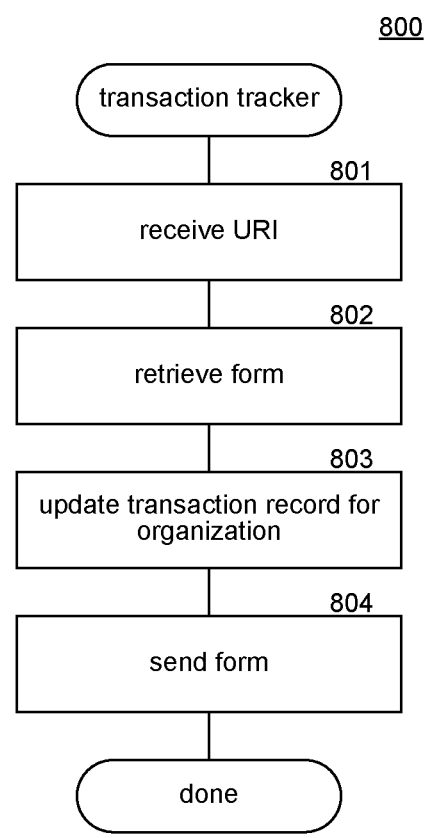
FIG. 8 is a flow diagram that illustrates the processing of a transaction tracker component of the per-use tracking system in some embodiments.

FIG. 8 is a flow diagram that illustrates the processing of a transaction tracker component of the per-use tracking system in some embodiments. The transaction tracker component 800 provides forms and records transactions upon receipt of a notification of successful use of the form. In block 801, the component receives a form identifier from a user device. In block 802, the component retrieves the identified form. In block 803, the component updates the transaction record for the organization to indicate that the form has been used successfully. In some embodiments, a complex form, such as a form with many pages, may represent multiple transactions. In such a case, the per-use tracking system may record multiple uses against an organization even though the complex form was only successfully submitted once. In block 804, the component sends the identified form to the user device.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, the term "current date" may mean the date when an allocation of user-periods is effective. If the initial allocation is to be effective in two weeks, then the current date would be considered to be in two weeks. Similarly, the date when the adding and removing of user is to occur is considered to be the current date or the effective date. If a depletion period is determined for an action (e.g., add a user) based on an effective date in the future, then that depletion period may need to be re-determined if an action is subsequently scheduled that has an earlier effective date. Accordingly, the invention is not limited except as by the appended claims.

We claim:

1. A method performed by a computing device for tracking allocation of computer resources to prevent unauthorized access to the computer resources, the method comprising:
    accessing a database having an allocation table and an allocation history table, wherein:
        the allocation table includes an allocation record for each organization that includes a number of users, a number of user-periods, and a depletion date; and
        the allocation history table includes a user-period record for each allocation of user-periods to an organization, an add user record for each addition of a user to an organization, and a remove user record for each removal of a user from an organization;
    allocating a number of user-periods for accessing a computer resource to an organization with a number of users;
    determining a depletion date based on the number of user-periods and the number of users;
    adding a user-period record to the allocation history table, the user-period record indicating the allocation of the number of user-periods to the organization;
    adding an allocation record for the organization to the allocation table, the allocation record including the number of users, the number of user-periods, and the depletion date;
    when a new user is added to the organization:
        re-determining the depletion date based on an additional user;
        adding an add user record to the allocation history table, the add user record indicating the addition of the new user to the organization; and
        updating the number of users and the depletion date in the allocation record for the organization,
        wherein the organization sends to the new user a uniform resource identifier (URI) via which the new user can access the computer resource, the URI identifying the computer resource and provided to only authorized users of the organization; and
    when a user is removed from the organization:
        re-determining the depletion date based on one less user;
        adding a remove user record to the allocation history table, the remove user record indicating the removal of the user from the organization; and
        updating the number of users and the depletion date in the allocation record for the organization,
        wherein the removed user is no longer an authorized user of the computer resource and prevented from accessing the computer resource.

2. The method of claim 1 further comprising determining whether a current date is within a warning threshold of the depletion date.

3. The method of claim 2 further comprising sending a notification to the organization when the current data is within a warning threshold of the depletion date.

4. The method of claim 1 wherein the determining of the depletion date comprises setting the depletion date to a sum of the current date and a quotient of the number of user-periods divided by the number of users.

5. The method of claim 1 wherein the re-determining of the depletion date based on an additional user comprises setting the depletion date to a sum of the current date and a quotient of a current depletion period divided by a ratio of the number of users to the number of users plus one.

6. The method of claim 1 wherein the re-determining of the depletion date based on one less user comprises setting the depletion date to a sum of the current date and a quotient of a current depletion period divided by a ratio of the number of users to the number of users minus one.

7. The method of claim 1 wherein the re-determining of the depletion date based on the additional number of user-periods further comprises adding to the current depletion date a quotient of the additional number of user-periods divided by number of users.

8. A computing device for tracking allocation of computer resources to prevent unauthorized access to the computer resources, the device comprising:
    a computer-readable storage medium storing computer-executable instructions comprising instructions that:
        maintain a database having an allocation table and an allocation history table, wherein:
            the allocation table includes an allocation record for each organization that includes a number of users, a number of user-periods, and a depletion date; and
            the allocation history table includes a user-period record for each allocation of user-periods to an organization, an add user record for each addition of a user to an organization, and a remove user record for each removal of a user from an organization;
        allocate a number of user-periods for accessing a computer resource to an organization with a number of users;
        determine a depletion date based on the number of user-periods and the number of users;
        add a first user-period record to the allocation history table, the first user-period record indicating the allocation of the number of user-periods to the organization;
        add an allocation record for the organization to the allocation table, the allocation record including the number of users, the number of user-periods, and the depletion date;
        when an additional number of user-periods are allocated to the organization:

re-determine the depletion date based on the additional number of user-periods;
when a new user is added to the organization:
re-determine the depletion date based on an additional user;
add an add user record to the allocation history table, the add user record indicating the addition of the new user to the organization; and
update the number of users and the depletion date in the allocation record for the organization,
wherein the organization sends to the new user a uniform resource identifier (URI) via which the new user can access the computer resource, the URI identifying the computer resource and provided to only authorized users of the organization; and
when a user is removed from the organization:
re-determine the depletion date based on one less user;
add a remove user record to the allocation history table, the remove user record indicating the removal of the user from the organization; and
update the number of users and the depletion date in the allocation record for the organization,
wherein the removed user is no longer an authorized user of the computer resource and prevented from accessing the computer resource; and
a hardware processor for executing the computer-executable instructions stored in the computer-readable storage medium.

9. The computing device of claim 8 wherein the instructions further comprise instructions that when a new user is added, re-determine the depletion date based on an additional user.

10. The computing device of claim 8 wherein the instructions further comprise instructions that when a user is removed, re-determine the depletion date based on one less user.

11. A computer-readable storage media storing computer-executable instructions for controlling a computing device to track allocation of computer resources to prevent unauthorized access to the computer resources, the instructions comprising:
instructions that maintain a database having an allocation table and an allocation history table, wherein:
the allocation table includes an allocation record for each organization that includes a number of users, a number of user-periods, and a depletion date; and
the allocation history table includes a user-period record for each allocation of user-periods to an organization, an add user record for each addition of a user to an organization, and a remove user record for each removal of a user from an organization;
instructions that allocate a number of user-periods for accessing a computer resource to an organization with a number of users;
instructions that determine a depletion date based on the number of user-periods and the number of users;
instructions that add a user-period record to the allocation history table, the user-period record indicating the allocation of the number of user-periods to the organization;
instructions that add an allocation record for the organization to the allocation table, the allocation record including the number of users, the number of user-periods, and the depletion date;
instructions that when a new user is added to the organization:
re-determine the depletion date based on an additional user;
add an add user record to the allocation history table, the add user record indicating the addition of the new user to the organization; and
update the number of users and the depletion date in the allocation record for the organization,
wherein the organization sends to the new user a URI via which the new user can access the computer resource, the URI identifying the computer resource and provided to only authorized users of the organization; and
instructions that when a user is removed from the organization:
re-determine the depletion date based on one less user;
add a remove user record to the allocation history table, the remove user record indicating the removal of the user from the organization; and
update the number of users and the depletion date in the allocation record for the organization,
wherein the removed user is no longer an authorized user of the computer resource and prevented from accessing the computer resource.

12. The computer-readable storage media of claim 11 further storing instructions that when an additional number of user-periods are allocated to the organization, re-determine the depletion date based on the additional number of user-periods.

* * * * *

UNITED STATES PATENT AND TRADEMARK OFFICE
CERTIFICATE OF CORRECTION

PATENT NO. : 10,623,413 B2
APPLICATION NO. : 16/230543
DATED : April 14, 2020
INVENTOR(S) : Adriana Neagu et al.

It is certified that error appears in the above-identified patent and that said Letters Patent is hereby corrected as shown below:

In the Claims

In Column 9, Line 28, in Claim 8, above "a hardware processor" insert -- add a second user-period record to the allocation history table, the second user-period record indicating the allocation of the additional number of user-periods to the organization; and update the number of user-periods and the depletion date in the allocation record for the organization; and --.

Signed and Sealed this
Twenty-seventh Day of October, 2020

Andrei Iancu
*Director of the United States Patent and Trademark Office*